United States Patent [19]

Dziedzic, Jr. et al.

[11] Patent Number: 5,006,019

[45] Date of Patent: Apr. 9, 1991

[54] PNEUMATIC PICKUP PROBE

[75] Inventors: Joseph H. Dziedzic, Jr., Chicago; Daniel A. Rubino, Carol Stream; Raymond J. Schaeffer, Lyons, all of Ill.

[73] Assignee: AEC, Inc., Wood Dale, Ill.

[21] Appl. No.: 375,458

[22] Filed: Jun. 29, 1989

[51] Int. Cl.⁵ ............................................. B65G 53/42
[52] U.S. Cl. .................................. 406/152; 406/141; 406/113
[58] Field of Search ............... 406/151, 152, 113, 114, 406/115, 141, 194; 294/64.1; 15/375, 421, 420; 239/33; 222/335, 464

[56] References Cited

U.S. PATENT DOCUMENTS

| | | | |
|---|---|---|---|
| 2,529,499 | 11/1950 | Jankelson | 15/421 |
| 3,048,876 | 8/1962 | Kemnitz | 15/421 |

FOREIGN PATENT DOCUMENTS

| | | | |
|---|---|---|---|
| 524125 | 3/1956 | Belgium | 15/421 |
| 237993 | 11/1909 | Fed. Rep. of Germany | 406/152 |
| 756093 | 8/1956 | United Kingdom | 222/464 |

Primary Examiner—Joseph F. Peters, Jr.
Assistant Examiner—Anne E. Bidwell
Attorney, Agent, or Firm—Kinzer, Plyer, Dorn, McEachran & Jambor

[57] ABSTRACT

A pneumatic pickup probe or wand, for picking up a dry flowable material from a container and introducing that material into a vacuum conveyor system, constitutes an elongated unitary pickup tube having a plurality of axially displaced air control holes near the vacuum conduit connection end of the tube; the material entry end of the tube is cut off at an acute angle (preferably about 45°), has a narrow, elongated flow modulation slot of about three inches (7.5 cm) axial length extending toward the hose connection end of the tube, and has an anti-closing spacer to preclude blockage of the material entry opening.

7 Claims, 1 Drawing Sheet

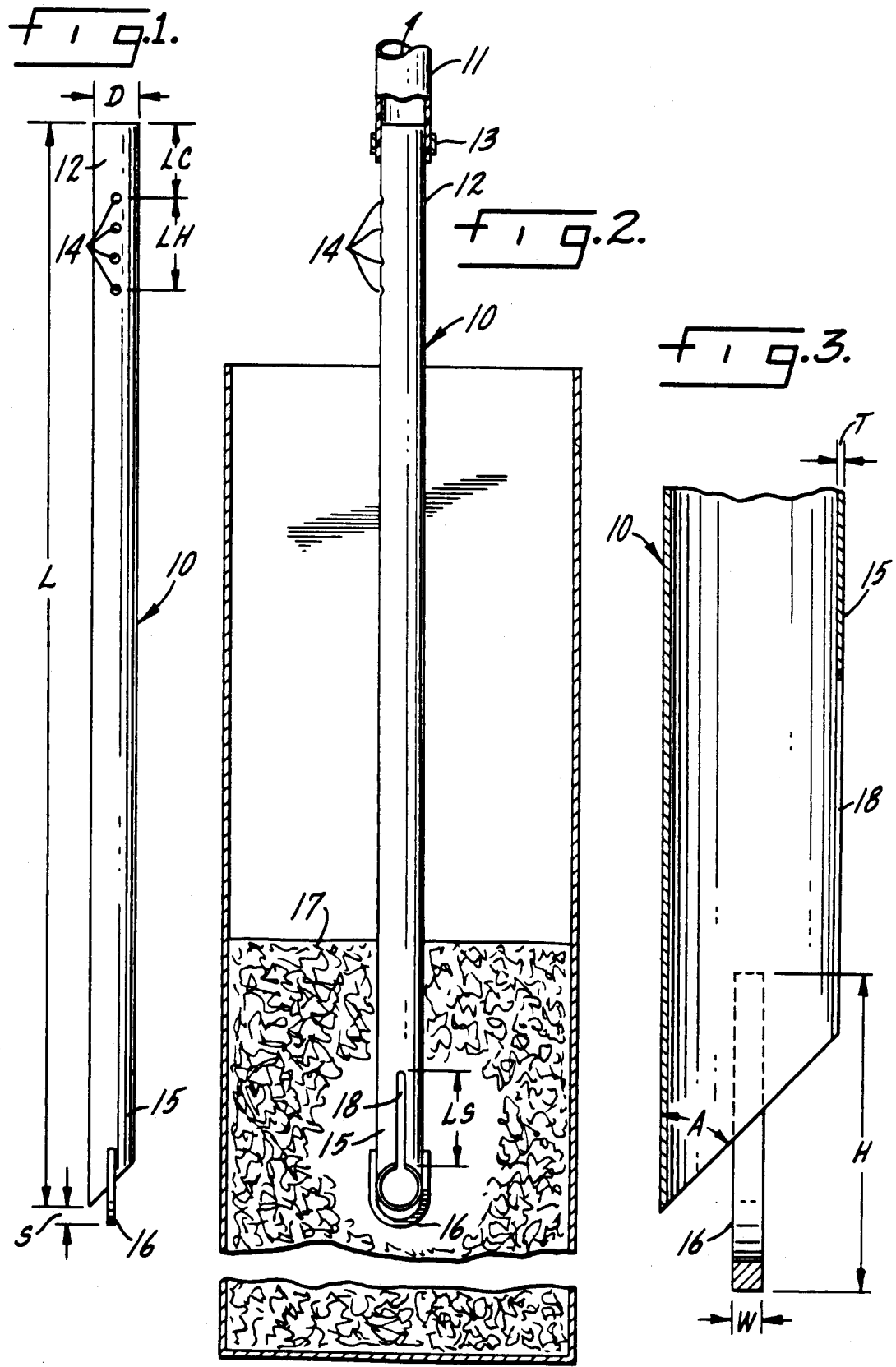

PNEUMATIC PICKUP PROBE

BACKGROUND OF THE INVENTION

In a vacuum or vacuum pressure conveying system, a dry flowable material is introduced into the system for transport from one location to another. In one simple example, granular or pelletized resin may be moved from a barrel or other container to a vacuum hopper that feeds a molding press or an extrusion press. The resin storage container may be close to the press or it may be some distance away. In a simple installation of this kind, a pneumatic pickup probe or wand, connected to a vacuum or vacuum pressure conveyor conduit, may be utilized to introduce the dry flowable resin into the conduit for transport to the vacuum hopper. The pickup probe also regulates the flow of material into the vacuum conveyor, being arranged to provide an optimum ratio of material and air at the pickup point within the storage container for the resin. When optimum conditions are achieved, the vacuum conveyor system operates most efficiently and can attain a maximum conveying rate.

A substantial variety of different constructions have been used for the pickup probe or wand employed to introduce dry flowable resins and other such materials into vacuum conveying systems. In general, the known pneumatic pickup probes have tended to be relatively complex in construction and hence more costly than desirable. The probes have frequently included moving parts that may fall off and hence may be transported into the molding machine or other equipment being fed by the vacuum conveyor system, with results that are frequently quite undesirable. Pickup wands of the prior art have also exhibited considerable difficulty in achieving a satisfactory ratio of air to the material being transported, with the result that optimum operation of the vacuum conveying system is not achieved. Yet another difficulty of previously known pneumatic probes has been a tendency to rest on the surface of the granular material supply instead of continuously burrowing into that supply as is desirable for extended operation.

SUMMARY OF THE INVENTION

It is a primary object of the present invention, therefore, to provide a new and improved pneumatic pickup probe for introducing a dry flowable material into a vacuum conveying system, which probe is simple and inexpensive in construction, light in weight, requires no moving parts, provides a thorough mixture of material and air in a controllable ratio, and is effective to burrow continuously into a supply of a dry flowable material.

Accordingly, the invention relates to a pneumatic pickup probe for introducing a dry flowable material into a vacuum conveying system; the probe comprises an elongated single wall pickup tube having a vacuum conveyor conduit connection end and a dry flowable material entry end, with at least one air opening in the pickup tube adjacent to but spaced from its conveyor conduit connection end. The material entry end of the tube is cut off at an acute angle A to the longitudinal axis of the tube to provide an inclined oval shaped opening into the tube, with A preferably at 45°. An anti-closing spacer is mounted on the material entry end of the pickup tube; it has a configuration adapted to preclude closing off of the material entry end of the pickup tube by proximity to a wall of a container. A narrow, elongated flow modulation slot extends from the upper end of the oval shaped material entry end of the tube toward the conveyor conduit connection end of the tube, the flow modulation slot having a axial length of about one to eight inches (2.5 to 20 cm).

BRIEF DESCRIPTION OF THE DRAWINGS

FIG. 1 is an elevation view of a pneumatic pickup probe constructed in accordance with a preferred embodiment of the present invention;

FIG. 2 is an elevation view of the probe of FIG. 1, rotated ninety degrees about its axis, and shown inserted into a container of a dry flowable material, which container is illustrated in section; and FIG. 3 is a sectional view of one end of the probe of FIGS. 1 and 2, in the orientation of FIG. 1, drawn to a substantially enlarged scale.

DESCRIPTION OF THE PREFERRED EMBODIMENT

FIGS. 1-3 illustrate a pneumatic pickup probe or wand 10 utilized to introduce a dry flowable material, such as granular or pelletized resin, into a vacuum conveying system. Probe 10 is constructed in accordance with a preferred embodiment of the present invention. The vacuum conveying system itself may be of any conventional construction; the only portion of the vacuum conveyor that is shown in the drawings is a pickup conduit or hose 11 shown mounted on the upper end 12 of probe 10, in FIG. 2, by an appropriate hose clamp 13. The pneumatic pickup probe 10 constitutes an elongated thin wall tube preferably having a length L of about three feet (one meter). Typically, the tubing for probe 10 may be thin wall aluminum or stainless steel tubing. If desired, however, resin tubing or other metal tubing might be employed. The tube for probe 10 has an outside diameter D and a wall thickness T; diameter D is selected to match up with the vacuum conveyor conduit 11 with which wand 10 is to be employed.

The upper end 12 of pneumatic probe 10, constituting the vacuum conveyor conduit connection end, includes a plurality of air openings 14. Air openings 14 are simply small holes in the tubing that comprises wand 10; typically, these may be holes having a diameter of one-fourth inch (0.6 cm) spaced about one inch (2.5 cm) from each other. Air holes 14 are located near the hose connection end of the tubular probe, but spaced from the tube end by a distance LC; the air holes are distributed longitudinally of the pickup tube through a relatively short distance LH.

The lower end 15 of the pickup tube comprising wand 10 is the material entry end of the probe. An anti-closing spacer 16 is welded or otherwise mounted on the material entry end 15 of the pickup tube. Spacer 16 should have a configuration adapted to preclude closing off of the material entry end of pickup probe 10 by a container wall. In the illustrated construction, spacer 16 is a simple U-shaped metal rod that is welded to the lower end 15 of probe 10 and that projects a short distance S beyond the lowermost end 15 of the pickup probe tube.

The lower or material entry end 15 of pneumatic pickup wand 10 is cut off at an acute angle A to the vertical (see FIG. 3). This is done in order to assure improved access for granular material 17 into the interior of probe 10 and also affords added protection against closing or clogging of the entry to the probe. A narrow, elongated flow modulation slot 18 extends upwardly from the material entry end of the tubular probe 10 toward the vacuum conduit connection end of the tube. This flow modulation slot 18 has a predetermined axial length LS that is preferably in a range of about one to eight inches (2.5 to 20 cm). The optimum length for slot 18, in a probe having a diameter of 1.5 inches (4.8 cm), is about three inches (7.5 cm).

Pneumatic pickup probe 10 is substantially lighter in weight than any previously known pneumatic wand affording comparable performance and hence is easier for a workman to manipulate when it becomes necessary to transfer the pickup probe from one container for dry flowable material to another. Probe 10 has no moving parts. There is nothing that can fall off of the probe and get into the vacuum conveyor system represented by hose 11 to interfere with its operation or to damage a molding machine or other equipment to which the vacuum conveyor system is connected. In operation, probe 10 is generally self-modulating, providing a thorough mixture of the dry flowable material 17 with the air flowing through probe 10 and into hose 11. This is critical to accomplishment of optimum operation of the vacuum conveyor system of which conduit 11 is a part. The ratio of material to air can be adjusted by closing off one or more of the air openings 14, though this normally is not necessary for pelletized materials. Probe 10 is effective to burrow continuously into the material supply, such as the dry flowable material 17, an action that is controlled by the air requirements of the overall system.

In achieving the operation described above, slot 18 is of substantial importance. This slot, in combination with air holes 14, determines the flow ratio of material 17 to air, providing an optimum mixture for conveying purposes. It appears that the pattern of air flow within probe 10 also aids in causing the probe to burrow into material supply 17. This allows the conveyor system represented by hose 11 to work more efficiently and improves the overall conveying cycle.

To afford a complete example of a preferred probe construction, approximate dimensions for probe 10, as constructed of either aluminum or stainless steel, are set forth below. It should be understood that these constitute a specific example and are not presented as a limitation on the invention.

| Dimension | Inches | Cm. |
|---|---|---|
| L | 36 | 100 |
| LC | 3 | 7.5 |
| LH | 4 | 10 |
| LS | 3 | 7.5 |
| H | 2.6 | 6.6 |
| W | .25 | .67 |
| S | .38 | 1 |

| Dimension | Inches | Cm. |
|---|---|---|
| -continued | | |
| T | .06 | .15 |
| D | 1.5 | 4.8 |

We claim:

1. A pneumatic pickup probe for introducing a dry flowable material into a vacuum conveying system, comprising:
    an elongated single-walled pickup tube having a vacuum conveyor conduit connection end and a dry flowable material entry end,
    at least one air opening extending through the single wall of the pickup tube, adjacent to but spaced from the conveyor conduit connection end of the pickup tube,
    an anti-closing spacer mounted on the material entry end of the pickup tube and having a configuration adapted to preclude closing off of the material entry end of the pickup tube by proximity to a wall of a container,
    the material entry end of the tube being cut off at an acute angle A to the longitudinal axis of the tube to provide an inclined, oval-shaped opening in the material entry end of the tube, and
    a narrow, elongated flow modulation slot extending from the upper end of the oval-shaped opening in the material entry end of the tube towards the conveyor conduit connection end of the tube, the flow modulation slot having an axial length of about one to eight inches (2.5 to 20 cm).

2. A pneumatic pickup probe for a vacuum conveying system, according to claim 1, in which the axial length of the flow modulation slot is approximately three inches (7.5 cm).

3. A pneumatic pickup probe for a vacuum conveying system, according to claim 1, in which the angle A is approximately 45°.

4. A pneumatic pickup probe for a vacuum conveying system, according to claim 1, in which the pickup tube has a plurality of air openings adjacent to but spaced from the conveyor conduit connection end of the pickup tube.

5. A pneumatic pickup probe for a vacuum conveying system, according to claim 1, in which the flow modulation slot is linear and has a width of about one-fourth inch (0.6 cm).

6. A pneumatic pickup probe for a vacuum conveying system, according to claim 1, in which the length of the pickup tube is about thirty-six inches (1 meter).

7. A magnetic pickup probe for a vacuum conveying system, according to claim 1, in which said anti-closing spacer is U-shaped, straddles the single-walled pickup tube and extends below the inclined oval-shaped opening in the material entry end of the tube.

* * * * *